(12) United States Patent  
Hwang et al.

(10) Patent No.: US 10,480,677 B2  
(45) Date of Patent: Nov. 19, 2019

(54) SOLENOID VALVE INCLUDING INDEPENDENTLY MOVABLE PILOT PLUNGER HEAD

(71) Applicants: HYUNDAI MOTOR COMPANY, Seoul (KR); KIA MOTORS CORPORATION, Seoul (KR)

(72) Inventors: Ki Ho Hwang, Seoul (KR); Chang Ho Kim, Yongin-si (KR); Jang Ho Choi, Seoul (KR); Hyung Ki Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/818,586

(22) Filed: Nov. 20, 2017

(65) Prior Publication Data

US 2018/0209560 A1   Jul. 26, 2018

(30) Foreign Application Priority Data

Jan. 25, 2017  (KR) .......................... 10-2017-0011758

(51) Int. Cl.
*F16K 31/40* (2006.01)
*F16K 1/12* (2006.01)
(Continued)

(52) U.S. Cl.
CPC ............ *F16K 31/408* (2013.01); *F16K 1/126* (2013.01); *F16K 1/302* (2013.01); *F16K 27/029* (2013.01); *F17C 13/04* (2013.01); *H01M 8/04201* (2013.01); *F17C 2205/0326* (2013.01); *F17C 2205/0332* (2013.01); *F17C 2205/0335* (2013.01); *F17C 2205/0341* (2013.01);
(Continued)

(58) Field of Classification Search
CPC .......................... F16K 31/406; F16K 31/408
USPC ........................................................ 251/30.03
See application file for complete search history.

(56) References Cited

U.S. PATENT DOCUMENTS 6,076,550 A  *  6/2000  Hiraishi ............. F16K 31/0655  
                                                            137/550  
6,740,827 B1     5/2004  Liantonio  
(Continued)

FOREIGN PATENT DOCUMENTS

KR   10-1094211 B1   12/2011  
KR   10-1261832 B1   5/2013  
(Continued)

*Primary Examiner* — Matthew W Jellett  
(74) *Attorney, Agent, or Firm* — Morgan, Lewis & Bockius LLP (57) ABSTRACT

A solenoid valve includes: an independently movable pilot plunger head; a main seat including a hole, so that gas flows into the solenoid valve through the hole of the main seat; a main plunger being in contact with the main seat; a pilot plunger disposed at top surface of the main plunger inside the solenoid valve, and including a hollow portion inside the pilot plunger; and a pilot plunger head disposed at one side inside the pilot plunger, and having an apex being in contact with the main plunger. The pilot plunger is movable inside the valve, the pilot plunger head is movable inside the hollow portion of the pilot plunger, and the pilot plunger head and the pilot plunger separately move from each other.

12 Claims, 4 Drawing Sheets

(51) Int. Cl.
*F16K 1/30* (2006.01)
*F16K 27/02* (2006.01)
*F17C 13/04* (2006.01)
*H01M 8/04082* (2016.01)

(52) U.S. Cl.
CPC ............... *F17C 2221/012* (2013.01); *F17C 2223/0123* (2013.01); *F17C 2223/036* (2013.01); *F17C 2250/032* (2013.01); *F17C 2250/0439* (2013.01); *F17C 2270/0168* (2013.01); *F17C 2270/0184* (2013.01)

(56) References Cited

U.S. PATENT DOCUMENTS

| | | | |
|---|---|---|---|
| 7,309,113 B2* | 12/2007 | Carter | F16K 31/406 137/505 |
| 8,641,153 B2* | 2/2014 | Voss | B60T 8/363 137/269 |
| 8,960,638 B2* | 2/2015 | Da Pont | F16K 31/404 251/129.15 |
| 9,033,305 B2* | 5/2015 | Schreier | F16K 31/408 251/30.01 |
| 2011/0056993 A1* | 3/2011 | Lee | A61L 2/238 222/256 |
| 2016/0169404 A1* | 6/2016 | Choi | F16K 31/408 251/129.15 |

FOREIGN PATENT DOCUMENTS

| | | |
|---|---|---|
| KR | 10-2013-0136239 A | 12/2013 |
| KR | 10-1628569 B1 | 6/2016 |

\* cited by examiner

SOLENOID VALVE INCLUDING INDEPENDENTLY MOVABLE PILOT PLUNGER HEAD

CROSS-REFERENCE TO RELATED APPLICATION

This application claims the benefit of priority to under 35 U.S.C. § 119(a) the benefit of Korean Patent Application No. 10-2017-0011758 filed on Jan. 25, 2017, the entire content of which is incorporated herein by reference.

TECHNICAL FIELD

The present disclosure relates to a structure of a solenoid valve providable in a hydrogen storing system of a vehicle in which a fuel cell system is mountable. More particularly, the present disclosure relates to a solenoid valve including a main plunger and a pilot plunger, in which a pilot plunger head that is providable at one end of the pilot plunger and the pilot plunger are independently movable.

BACKGROUND

In general, a hydrogen storing system of a fuel cell vehicle includes a refueling port for filling hydrogen, a solenoid valve, a hydrogen tank, a pressure regulator, and high pressure tubes connecting the above components.

High pressure compressed hydrogen of about 700 bars is stored in a high pressure vessel (hydrogen vessel) provided in the fuel storing system, that is, a hydrogen storing system, and the stored compressed hydrogen is discharged to a high pressure line according to on/off of a high pressure solenoid valve mounted at an inlet part of the hydrogen vessel and then is depressurized while passing through the pressure regulator and the hydrogen supply valve to be supplied to the fuel cell stack.

A configuration of a part in which the fuel cell vehicle is refueled with high pressure hydrogen, will be described. A part of the vehicle coupled with a refueling nozzle of a hydrogen station is a hydrogen refueling port (or a refueling receptacle), and the refueled hydrogen gas is filled in the high pressure vessel through a valve coupled to the high pressure vessel (or the hydrogen tank) through the high pressure pipe.

In the meantime, a valve using a solenoid may be used as the valve applicable to the hydrogen storing system of the fuel cell vehicle. In general, the solenoid valve opens or closes a valve by using an electromagnet principle, and particularly, the solenoid valve may transmit physical force generated in a predetermined direction to open or close a hole between a cylinder and a plunger. The valve may control a flow of a fluid according to the opening or the close of the hole, and may be broadly used in various industrial fields, such as electric, electronic, and mechanical devices.

However, high pressure gas may flow into the valve according to an ascent or a descent of the plunger inside the solenoid valve, and in this case, a pressure of the high pressure gas may directly hit a plunger head portion, so that the plunger head is damaged in some cases.

Particularly, when high pressure gas is simultaneously supplied and refueled in a flow path, in which the solenoid valve may be positioned, a probability that the plunger head is damaged by the pressure of the refueled gas may be considerably increased. Accordingly, there is a need for a structure of a solenoid valve, which is capable of preventing the plunger head from being damaged by the high pressure of the pressure gas.

The above information disclosed in this Background section is only for enhancement of understanding of the background of the invention, and therefore, it may contain information that does not form the related art that is already known in this country to a person of ordinary skill in the art.

SUMMARY OF THE DISCLOSURE

The present disclosure has been made in an effort to solve the above-described problems associated with the related art.

Accordingly, the present disclosure provides a structure of a solenoid valve providable in a hydrogen storing system of a fuel cell system and including an independently movable pilot plunger head, in which a main plunger and a pilot plunger are provided, and a head of the pilot plunger is independently movable with respect to the pilot plunger in an internal space of the pilot plunger, and even though high pressure, such as refueling pressure, is applied to the plunger head, it is possible to prevent the plunger head from being damaged.

According to one aspect of the present disclosure, a solenoid valve, which is disposed in a flow path extending from a high pressure vessel to open or close the flow path, includes: an independently movable pilot plunger head; a main seat including a hole, through which gas flows into the valve; a main plunger, which is in contact with the main seat; a pilot plunger disposed at a top surface of the main plunger inside the valve, and including a hollow portion inside the pilot plunger; and a pilot plunger head disposed inside the pilot plunger, having an apex which is in contact with the main plunger. The pilot plunger is movable inside the valve, the pilot plunger head is movable inside the hollow portion of the pilot plunger, and the pilot plunger head and the pilot plunger separately move from each other.

The solenoid valve may further include a protrusion formed on a surface, in which the main plunger is in contact with the pilot plunger.

The protrusion may be formed of a metal.

The solenoid valve may further include a spring, which is attached to one side of the pilot plunger head and is provided inside the hollow portion.

The solenoid valve may further include a spring guide, which is provided inside the hollow portion so as to accommodate the spring.

The solenoid valve may further include a frictional member, which is provided between the spring and an inner circumferential surface of the pilot plunger.

The solenoid valve may further include: a solenoid valve guide, which surrounds an outer circumferential surface of the solenoid valve; and a fixing metal pin, which is in contact with one end of the solenoid valve guide, in which the main seat is in contact with the other end of the solenoid valve guide.

The pilot plunger and the main plunger may be disposable inside the solenoid valve guide, and may be movable between the fixing metal pin and the main seat.

The solenoid valve may further include a spring, which is attached to one side of the pilot plunger head, and is provided inside the hollow portion, in which one side of the spring may be in contact with the pilot plunger head, and the other side of the spring may be in contact with the fixing metal pin.

The solenoid valve may further include a frictional member, which is formed to regulate a movement of the main plunger between the main plunger and the solenoid valve guide.

The pilot plunger head may be formed of a plastic or rubber material.

The solenoid valve may be provided in a system, in which a charging flow path and a supply flow path of the high pressure vessel are the same.

The main plunger may further include a flow path passing through the center of the main plunger, and one end of the flow path may be connected with the hole of the main seat, and the other end of the flow path may be in close contact with or may be separated from the pilot plunger head.

Through the aforementioned technical solutions, the present disclosure provides the effects below.

According to the present disclosure, when fuel, such as hydrogen, is charged in a hydrogen storing system of a fuel cell system, it is possible to distribute or decrease the amount of impact applicable to the solenoid valve by a moment application of high charging pressure or a rapid inflow of a charging flow quantity.

Accordingly, it is possible to relieve impact applied to the pilot plunger head of the solenoid valve, and prevent the pilot plunger head of the solenoid valve from being damaged, thereby removing costs and processes required for replacing the components.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only an exemplary embodiments, but also various alternatives, modifications, equivalents and other embodiments, which may be included within the spirit and scope of the invention as defined by the appended claims.

Hereinafter, an exemplary embodiment of the present disclosure will be described in more detail with reference to the accompanying drawings. An exemplary embodiment of the present disclosure may be modified in various forms, and the scope of the present disclosure is not interpreted as being limited to an exemplary embodiments described below. The present exemplary embodiments are provided for more completely explaining the present disclosure to those skilled in the art.

The terms " . . . part", " . . . unit", " . . . module", and the like described in the specification mean units for processing at least one function and operation and may be implemented by hardware components or software components and combinations thereof. Further, the expressions, such as "one side, the other side, one end, and the other end" described in the specification are for clearly indicating a predetermined point of a corresponding configuration, and may be used as a similar meaning without a discrimination of a word.

A hydrogen storing system mounted in a vehicle may include a refueling port, through which hydrogen refueling is performed, a refueling part including a communication emitter, a high pressure vessel for safely storing hydrogen, a storing unit including a valve, a decompressing part primarily adjusting a pressure of high pressure hydrogen, a control unit processing signals of temperature and pressure sensors included in the hydrogen storing system and controlling opening/closing of a plurality of valves provided in the system, and the like.

A solenoid valve (hereinafter, a "valve" referred in the present specification may mean a solenoid valve) in the present disclosure may be driven with electromagnetic force, and may be a normally closed (NC) type valve. Further, the solenoid valve in the present disclosure may control a flow of a fluid at one point of a flow path provided with the solenoid valve by electromagnetic force.

Figure 1:
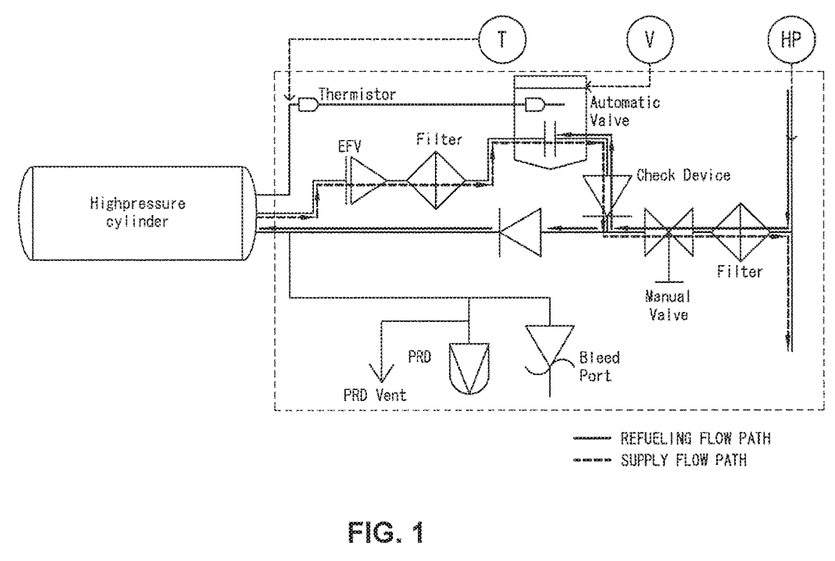
FIG. 1 is a diagram illustrating a connection relationship between configurations of an exemplary embodiment, in which a charging line and a supply line of a gas storing system are separable, in a fuel cell system.
Figure 2:
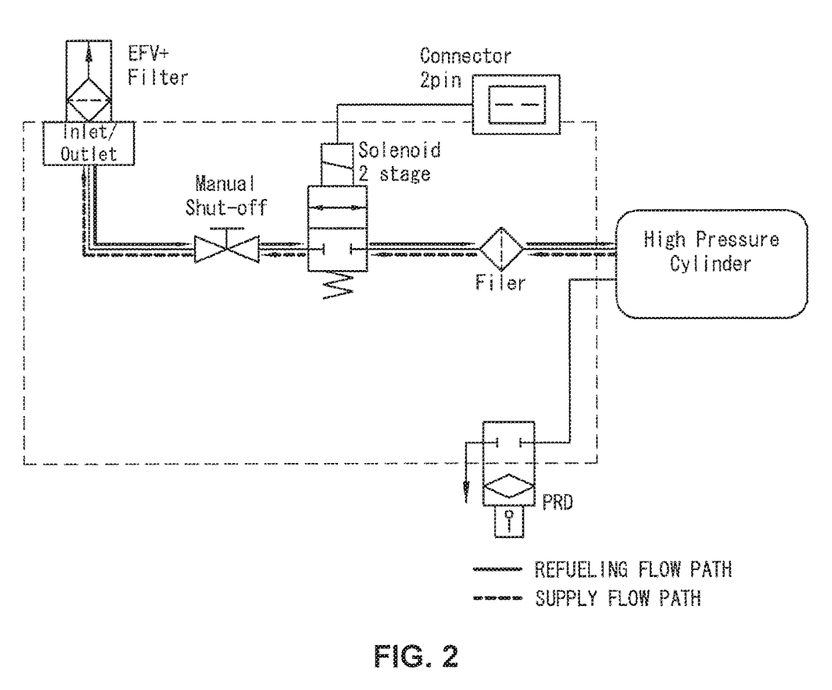
FIG. 2 is a diagram illustrating a connection relationship between configurations in the case where a charging line and a supply line of a gas storing system are the same in a fuel cell system as another exemplary embodiment.

FIGS. 1 and 2 are diagrams illustrating a connection relationship of a hydrogen storing system adopting a solenoid valve according to an exemplary embodiment of the present disclosure. FIG. 1 is a diagram illustrating a connection relationship between configurations of a fuel cell system in the case where a refueling line of gas chargeable into a high pressure vessel and a supply line of gas dischargeable from the inner side of the high pressure vessel are separated in the high pressure vessel. According to FIG. 1, high pressure gas refueled along a filling flow path passes through a manual valve and meets a branched point, and at the branched point, some of the high pressure gas may be branched to a valve disposable in a supply flow path. Accordingly, a pressure of the refueled high pressure gas may be applied to a region, in which a plunger head of the valve is positioned.

FIG. 2 is a diagram illustrating a connection relationship between configurations of a hydrogen storing system in the case where a filling line of gas chargeable into a high pressure vessel and a supply line of gas dischargeable from the inner side of the high pressure vessel are formed of the same line in the high pressure vessel. According to FIG. 2, since a refueling flow path is the same as a supply flow path, refueled high pressure gas inevitably passes through a solenoid valve disposable at one point in the flow path, and correspondingly, similar to FIG. 1, a pressure of the refueled high pressure gas may be applied to a region, in which a plunger head of the valve is positioned.

Accordingly, the solenoid valve according to the present disclosure may be applied to the cases of FIGS. 1 and 2, that is, the case where the refueling line is separated from the supply line of the fuel cell system and the case where the refueling line is integrated with the supply line of the fuel cell system.

Hereinafter, a structure of a solenoid valve including an independently movable pilot plunger head 400 according to an exemplary embodiment of the present disclosure will be described in detail with reference to FIG. 3.

Figure 3:
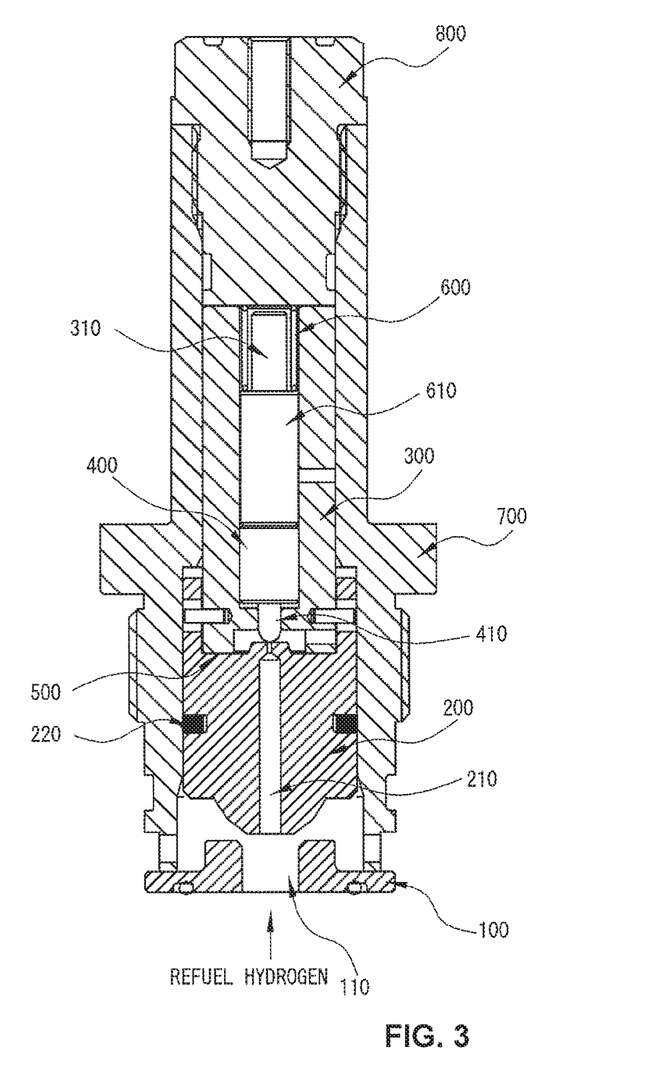
FIG. 3 is a cross-sectional view of a solenoid valve including an independently movable pilot plunger head according to an exemplary embodiment of the present disclosure.

FIG. 3 is a cross-sectional view of a solenoid valve according to an exemplary embodiment of the present disclosure. The solenoid valve according to an exemplary embodiment of the present disclosure may be provided at one point of a flow path extendable from a high pressure vessel, and may serve to open or close the flow path. The solenoid valve according to an exemplary embodiment of the present disclosure may include a solenoid valve guide 700 for surrounding an outer circumferential surface of the solenoid valve.

A fixing metal pin 800 may be provided at one end of the solenoid valve. The fixing metal pin 800 may be in contact with the solenoid valve guide 700 in an upper portion of the solenoid valve and thus may form the outer circumferential surface of the solenoid valve together with the solenoid valve guide 700. The solenoid valve guide 700 may have a hollow cylinder form. Further, plungers may be provided inside the solenoid valve guide 700, and the plungers may reciprocate inside the cylinder.

Further, based on the solenoid valve guide 700, a main seat 100 may be provided at another end of an opposite side of the fixing metal pin 800, or a lower end of the solenoid valve. Further, a main plunger 200, which may be in close contact with the main seat 100 or may be separable from the main seat 100, and is movable in a vertical direction, may be provided inside the solenoid valve. Particularly, the main plunger 200 may vertically reciprocate along the solenoid valve guide 700 inside the solenoid valve guide 700 by a predetermined distance. A sealing member 220 for controlling a movement of the main plunger may be provided between the main plunger and the solenoid valve guide 700, or an O-ring formed of a rubber material and the like may be provided.

The main seat 100 may be in contact with the solenoid valve guide 700 at one side of the valve, and may be formed of a material capable of maintaining air tightness. According to an exemplary embodiment of the present disclosure, the main seat 100 may include a hole 110 having a predetermined diameter at the center thereof. Accordingly, gas, such as hydrogen, may flow in from the flow path or may be discharged to the flow path from the inner side of the valve through the hole 110.

The main plunger 200 may include a flow path 210 having a predetermined diameter, which may be formed at the center inside the main plunger 200. Further, an orifice having a smaller diameter than that of the flow path of the main plunger 200 having the predetermined diameter may be formed in a region close to a pilot plunger 300 to be described below in the flow path 210 inside the main plunger 200.

The main plunger 200 may be movable by a control unit, and accordingly, when the main plunger 200 moves down and is in close contact with the main seat 100, the valve may be closed. Accordingly, in this case, the flow path formed with the valve may be in a blocked state. Further, when the main plunger 200 moves up and thus is separated from the main seat 100, the valve is opened and thus a fluid may freely flow in the flow path formed with the valve.

Turning to FIG. 3, the valve according to an exemplary embodiment of the present disclosure may include the pilot plunger 300, a pilot plunger head 400, and a spring 600. The pilot plunger 300 may be provided inside the valve, and particularly, may be provided at a top of the main plunger 200 inside the valve.

The pilot plunger 300 may also be formed inside the solenoid valve guide 700 to reciprocate along the solenoid valve guide 700, and particularly, the pilot plunger 300 may be provided between the main plunger 200 and the fixing metal pin 800 and may reciprocate by a predetermined distance. According to an exemplary embodiment of the present disclosure, the pilot plunger 300 may be provided between the upper end of the main plunger 200 and a lower end of the fixing metal pin 800. Further, the pilot plunger 300 may include a hollow portion 310 inside thereof. A shape of the hollow portion 310 is not limited, but if the hollow portion 310 has a shape and a predetermined length guaranteeing the movement of the pilot plunger head 400, the hollow portion 310 is considered to be enough.

In the meantime, the pilot plunger head 400 may be formed at one side of an inner portion of the pilot plunger 300. Particularly, the pilot plunger head 400 may be formed at one side of the hollow portion 310 of the pilot plunger. The pilot plunger head 400 may move inside the hollow portion 310 of the pilot plunger. Accordingly, the pilot plunger head 400 may be designed so as to correspond to the shape of the hollow portion 310 of the pilot plunger.

In the meantime, according to an exemplary embodiment of the present disclosure, one end of the pilot plunger head 400 may be sharpened. Hereinafter, the sharpened one end of the pilot plunger head 400 will be called a "pilot plunger head apex 410". That is, the pilot plunger head 400 may have a structure, in which the pilot plunger head apex 410 may be provided at one end of the pilot plunger head 400, and the spring 600 may be in contact with another end of the pilot plunger head 400.

In the meantime, the pilot plunger head 400 may reciprocate inside the hollow portion 310 of the pilot plunger.

That is, the pilot plunger head 400 may reciprocate inside the pilot plunger 300 in the vertical direction. Further, a movement of the pilot plunger 300 and a movement of the pilot plunger head 400 are separate, and the pilot plunger 300 and the pilot plunger head 400 are independently movable.

In the meantime, the pilot plunger head 400 may be basically maintained in the state of being in close contact with a rear end of the main plunger 200. Particularly, the pilot plunger head 400 may basically maintain the state where the pilot plunger head apex 410 is in contact with a rear end of the flow path 210 of the main plunger 200 to close the valve. That is, the pilot plunger head apex 410 may be in contact with the orifice of the flow path 210 of the main plunger 200, and a size of the pilot plunger head apex 410 is larger than a diameter of the orifice, so that the state where the pilot plunger head 400 seals the flow path 210 of the main plunger 200 may be maintained. The pilot plunger head 400 may be formed of a plastic or rubber material.

In the meantime, according to an exemplary embodiment of the present disclosure, the spring 600 may be provided inside the hollow portion 310 of the pilot plunger. The spring 600 may be attached to one side of the pilot plunger head 400 in the hollow portion 310, and the other side of the spring 600 may be in contact with the fixing metal pin 800 to be fixed. That is, the spring 600 may be provided in the hollow portion 310 of the pilot plunger, and one side of the spring 600 may be attached to the pilot plunger head 400, and another side of the spring 600 may be attached to the fixing metal pin 800. As the spring 600, a general spring having elastic force of a predetermined level or more required in a design may be used.

According to an exemplary embodiment of the present disclosure the spring 600 providable in the hollow portion 310 may further include a spring guide 610 surrounding the spring 600. The spring guide 610 may be optionally provided, and when the material of the pilot plunger head 400 is rubber or plastic, it is possible to prevent the pilot plunger head 400 from being damaged or worn by elastic force of the spring 600. That is, the spring guide 610 may serve as a guide adjusting elastic force of the spring 600 to supplement an elastic movement of the spring 600.

A frictional member for controlling the degree of movement of the spring 600 in response to elastic restoring force of the spring 600 may be formed between the spring 600 and an inner circumferential surface of the pilot plunger 300. When the spring guide 610 is provided, the frictional member may be formed between the spring guide 610 and the inner circumferential surface of the pilot plunger 300.

In the meantime, a protrusion 500 may be formed on a surface, in which the main plunger 200 is in contact with the pilot plunger 300, inside the solenoid valve. A shape of the protrusion 500 is not limited, but when the main plunger 200 collides with the pilot plunger 300, the protrusion 500 needs to absorb the amount of impact and relieve the impact. The protrusion 500 may be formed of a metal. According to an exemplary embodiment of the present disclosure, when an area, in which the protrusion 500 is formed, is large, the amount of impact relievable between the main plunger 200 and the pilot plunger 300 is increased and thus the protrusion 500 may relieve larger impact.

Figure 4:
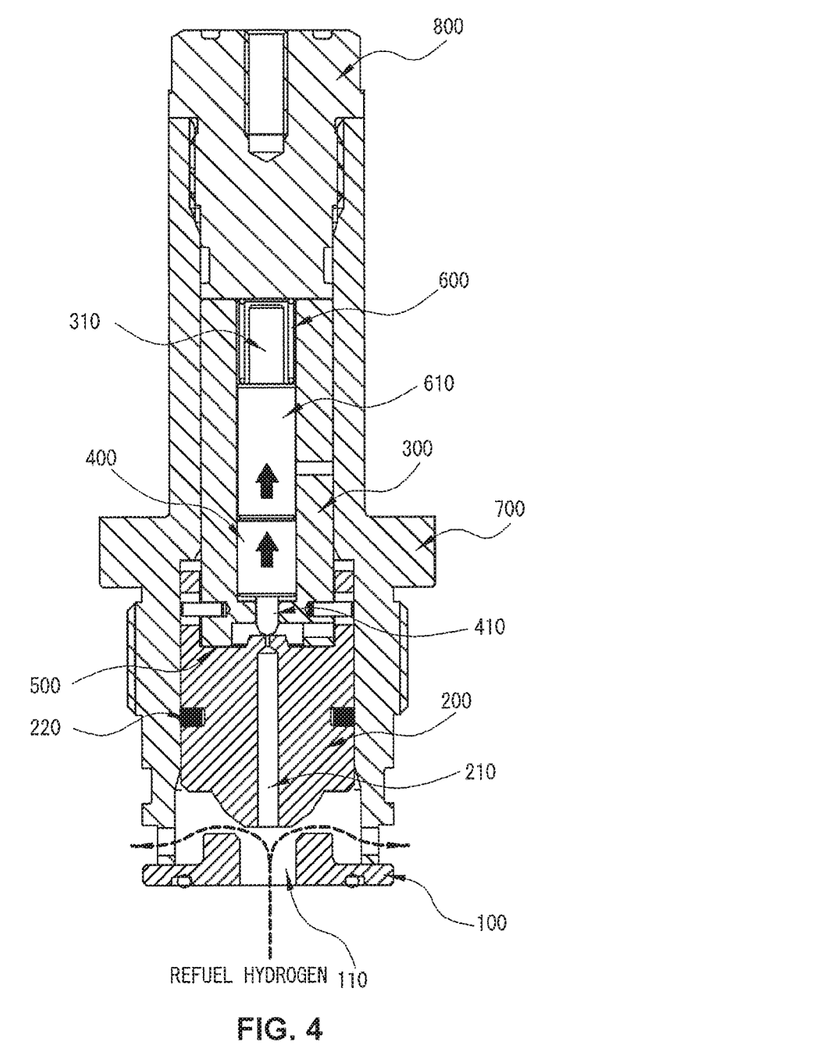
FIG. 4 is a diagram illustrating a movable direction of each configuration according to an application of a pressure of charged gas according to an exemplary embodiment of the present disclosure.

Hereinafter, an operation of the solenoid valve including the independently movable pilot plunger head 400 according to an exemplary embodiment of the present disclosure will be described in detail with reference to FIG. 4.

The solenoid valve before the inflow of high pressure charging gas, such as hydrogen, is the NC valve, so that the main plunger 200 is in close contact with the main seat 100 and the pilot plunger 300 is in contact with the main plunger 200, so that the valve may be maintained in the closed state. A position state of each valve configuration in this state may be expressed as "the valve is positioned at an original position".

When the refueling is initiated and gas flows from the gas refueling station, high pressure of the refueled gas may be applied to the hole 110 of the main seat 100. Accordingly, the main plunger 200 may be separated from the main seat 100 and be pulled back to a rear end by the high pressure of the refueled gas. According to the pull back of the main plunger 200, the main plunger 200 may collide with the pilot plunger 300 positioned at the rear end of the main plunger 200.

In the related art, impact is concentrated to the pilot plunger head, particularly, the pilot plunger head apex, by the impact, so that the pilot plunger head and/or the pilot plunger head apex may be damaged. However, in the present disclosure, according to the hit of the pilot plunger 300 by the main plunger 200, particularly, the hit of the pilot plunger head 400, more particularly, the hit of the pilot plunger head apex 410, the pilot plunger head 400 may be pushed into the hollow portion 310 of the pilot plunger independently from the pilot plunger 300. Particularly, the spring 600 at the rear end of the pilot plunger head 400 receives compressive force and is compressed by force hitting the pilot plunger head 400, and thus, the pilot plunger head 400 may be pulled back to the rear side inside the hollow portion 310 of the pilot plunger. Accordingly, the pilot plunger head 400 is pushed into the hollow portion 310, so that the amount of impact, which the pilot plunger head 400 receives, may be considerably decreased, and as a result, the impact applied to the pilot plunger and/or the pilot plunger head 400 is relieved, thereby preventing the corresponding component from being damaged.

When the high pressure gas is completely refueled and the high pressure of the refueling line and/or the supply line is removed, the pressure of the area of the hole 110 of the main seat 100 may be dropped to the original state again. Accordingly, in this case, restoration force of the spring 600 at the rear end of the pilot plunger head 400 may be larger than force of the main plunger 200 pressing the pilot plunger 300 and the pilot plunger head 400. Accordingly, the pilot plunger head 400 may be returned to the original position (the NC state of the valve) by the elastic restoration force of the spring 600 disposable at the rear end of the pilot plunger head 400. That is, the pilot plunger head 400 may be in contact with the orifice of the main plunger 200 again to seal the main plunger 200. Accordingly, the main plunger 200 may also be pressed in the direction of the main seat 100, and may be returned to the original position to be in contact with the main seat 100.

To sum up, the core spirit of the present disclosure is that in the solenoid valve including the pilot plunger, the movement of the pilot plunger is independent from the movement of the pilot plunger head.

That is, it shall be noted that the present disclosure is characterized in that when the main plunger hits the pilot plunger while being pulled back by external impact, the head of the pilot plunger, particularly, the head apex of the pilot plunger, does not receive all of the impact, but the protrusion between the pilot plunger and the main plunger absorbs the amount of impact while the pilot plunger head is pulled back inside the pilot plunger.

In the above description, an exemplary embodiments of the present disclosure have been described, but those with ordinary skill in the art to which the present disclosure pertains may variously modify and alter the present disclosure without departing from the spirit of the present disclosure disclosed in the claims by adding, changing, and deleting constituent elements, and the modification and alteration also belong to the scope of the present disclosure.

In the description of an exemplary embodiment of the present disclosure, a detailed description of known configurations or functions incorporated herein will be omitted when it is determined that the detailed description may unnecessarily make the subject matter of the present disclosure unclear. The terms which are described above are terms defined in consideration of the functions in an exemplary embodiment of the present disclosure, and may be changed according to intentions or practices of users and operators. Therefore, the definitions should be made based on the entire contents of the present specification. Accordingly, the detailed description of the invention does not intend to limit the present disclosure to an exemplary embodiment, and it shall be construed that the accompanying claims include other exemplary embodiments.

What is claimed is:

1. A solenoid valve, which is disposed in a flow path that extends from a high pressure vessel to open or close the flow path, the solenoid valve comprising:
   a main seat including a hole so that gas flows into the solenoid valve through the hole of the main seat;
   a main plunger configured to be in contact with the main seat;
   a pilot plunger, which is disposed at a top surface of the main plunger inside the solenoid valve, including a hollow portion therein; and
   a pilot plunger head, which disposed inside the pilot plunger, having an apex which is in contact with the main plunger, wherein the pilot plunger head moves independently,
   wherein the pilot plunger is movable inside the solenoid valve, and the pilot plunger head is movable inside the hollow portion of the pilot plunger,
   wherein the pilot plunger head and the pilot plunger separately move from each other,
   wherein the apex is arranged at a front end of the pilot plunger head,
   wherein the apex of the pilot plunger head is in contact with a main plunger flow path of the main plunger,
   wherein the solenoid valve further includes a spring attached to a rear end of the pilot plunger head toward the opposite direction to the main plunger and disposed inside the hollow portion, and
   wherein the pilot plunger head is arranged and configured to be pushed into the hollow portion of the pilot plunger independently from the pilot plunger according to the apex being impacted by the main plunger.

2. The solenoid valve of claim 1, wherein the pilot plunger has a protrusion at a bottom surface at which the main plunger is in contact with the pilot plunger.

3. The solenoid valve of claim 2, wherein the protrusion is formed of a metal.

4. The solenoid valve of claim 1, further comprising:
   a spring guide disposed inside the hollow portion to accommodate the spring.

5. The solenoid valve of claim 1, further comprising:
   a solenoid valve guide surrounding an outer circumferential surface of the solenoid valve; and
   a fixing metal pin being in contact with one end of the solenoid valve guide,
   wherein the main seat is in contact with another end of the solenoid valve guide.

6. The solenoid valve of claim 5, wherein the pilot plunger and the main plunger disposed inside the solenoid valve guide, and
   wherein the pilot plunger and the main plunger are movable between the fixing metal pin and the main seat.

7. The solenoid valve of claim 5,
   wherein one side of the spring is in contact with the pilot plunger head and another side of the spring is in contact with the fixing metal pin.

8. The solenoid valve of claim 1, wherein the pilot plunger head is formed of a plastic or rubber material.

9. The solenoid valve of claim 1, wherein the solenoid valve is installed in a hydrogen storing system where a refueling flow path and a supply flow path of the high pressure vessel are the same.

10. The solenoid valve of claim 1, wherein the main plunger flow path passes through a center of the main plunger, and
    wherein a first end of the main plunger flow path is connected with the hole of the main seat, and a second end of the main plunger flow path is in close contact with the pilot plunger head.

11. The solenoid valve of claim 10, wherein the second end of the main plunger flow path is separated from the pilot plunger head.

12. The solenoid valve of claim 1, wherein the main plunger is separated from the main seat.

* * * * *